US012739631B2

(12) United States Patent
Ramaiah et al.

(10) Patent No.: US 12,739,631 B2
(45) Date of Patent: Sep. 15, 2026

(54) SECURE WIRELESS ZERO TOUCH ONBOARDING OF COMPUTING DEVICES

(71) Applicant: Dell Products L.P., Round Rock, TX (US)

(72) Inventors: Mahesh Babu Ramaiah, Bangalore (IN); Mukesh Gupta, Shrewsbury, MA (US); Yuvakrishnan Sadhasivam, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 18/910,183

(22) Filed: Oct. 9, 2024

(65) Prior Publication Data

US 2026/0101182 A1 Apr. 9, 2026

(51) Int. Cl.
*H04L 29/00* (2006.01)
*H04W 12/06* (2021.01)
*H04W 12/102* (2021.01)

(52) U.S. Cl.
CPC ......... *H04W 12/06* (2013.01); *H04W 12/102* (2021.01)

(58) Field of Classification Search
CPC ............................ H04W 12/06; H04W 12/102
See application file for complete search history.

(56) References Cited

U.S. PATENT DOCUMENTS 8,646,060 B1 * 2/2014 Ben Ayed ............... H04W 4/20 726/9
9,071,967 B1 * 6/2015 Davies ................ H04W 12/069
11,032,708 B2 * 6/2021 Hsiao .................. H04L 63/0471
11,284,258 B1 * 3/2022 Wei ......................... H04L 63/10
11,423,138 B2 * 8/2022 Ferreira ................ G06F 21/121
11,651,357 B2 * 5/2023 Kumar ................ H04L 63/0838 705/73
12,495,283 B2 * 12/2025 Jain ....................... H04L 63/062
(Continued)

OTHER PUBLICATIONS

Wi-Fi Alliance, "Wi-Fi Easy Connect Specification," chrome-extension://efaidnbmnnnibpcajpcglclefindmkaj/https://www.wi-fi.org/system/files/Wi-Fi_Easy_Connect_Specification_v3.0.pdf, Version 3.0, Dec. 2022, 188 pages.
(Continued)

*Primary Examiner* — Don G Zhao
(74) *Attorney, Agent, or Firm* — Ryan, Mason & Lewis, LLP

(57) ABSTRACT

An apparatus comprises at least one processing device configured to obtain a data structure comprising information utilizable for generating a temporary wireless credential for an endpoint computing device deployed at a first computing site, the temporary wireless credential being provisioned in the endpoint computing device at a second computing site different than the first computing site. The at least one processing device is also configured to generate the temporary wireless credential for the endpoint computing device based on the obtained data structure, to provision the temporary wireless credential in a wireless network device at the first computing site, and, responsive to successfully verifying a wireless connection between the endpoint computing device and the wireless network device, to provision an updated wireless credential in the endpoint computing device and the wireless network device, the updated wireless credential being specified by an operator of the first computing site.

20 Claims, 12 Drawing Sheets

(56) References Cited

U.S. PATENT DOCUMENTS

| | | | | |
|---|---|---|---|---|
| 12,532,174 | B2 * | 1/2026 | Hsu | H04W 12/065 |
| 12,542,687 | B1 * | 2/2026 | Goodman | H04L 9/3265 |
| 2017/0245146 | A1 * | 8/2017 | Rolfe | H04L 9/3236 |
| 2017/0337080 | A1 * | 11/2017 | Manescu | G06F 9/541 |
| 2018/0242129 | A1 * | 8/2018 | Shah | H04L 63/12 |
| 2019/0042779 | A1 * | 2/2019 | Agerstam | G06F 21/554 |
| 2019/0268375 | A1 * | 8/2019 | Gundavelli | H04L 63/102 |
| 2019/0363894 | A1 * | 11/2019 | Kumar Ujjwal | H04L 9/3268 |
| 2020/0100108 | A1 * | 3/2020 | Everson | H04W 12/041 |
| 2020/0403994 | A1 * | 12/2020 | Bitterfeld | H04L 63/0884 |
| 2021/0014681 | A1 * | 1/2021 | Pang | H04W 12/04 |
| 2021/0075618 | A1 * | 3/2021 | Stephenson | H04L 9/0869 |
| 2023/0164139 | A1 * | 5/2023 | Chien | H04L 63/083 455/411 |
| 2023/0229758 | A1 * | 7/2023 | Terpstra | G06F 21/54 726/26 |
| 2023/0229778 | A1 * | 7/2023 | Terpstra | G06F 21/73 713/2 |
| 2023/0229779 | A1 * | 7/2023 | Terpstra | G06F 8/63 713/2 |
| 2024/0098492 | A1 * | 3/2024 | Hsu | H04W 12/065 |
| 2024/0291667 | A1 * | 8/2024 | Singh | H04W 4/80 |
| 2025/0373606 | A1 * | 12/2025 | Vysyaraju | H04L 63/0876 |

OTHER PUBLICATIONS

Fido Alliance, "Client to Authenticator Protocol (CTAP)," https://fidoalliance.org/specs/fido-v2.1-ps-20210615/fido-client-to-authenticator-protocol-v2.1-ps-errata-20220621.html, Jun. 21, 2022, 192 pages.

Practical Cryptography for Developers, "Argon2," https://cryptobook.nakov.com/mac-and-key-derivation/argon2, Accessed Sep. 25, 2024, 5 pages.

Practical Cryptography for Developers, "Bcrypt," https://cryptobook.nakov.com/mac-and-key-derivation/bcrypt, Accessed Sep. 25, 2024, 2 pages.

Practical Cryptography for Developers, "Scrypt," https://cryptobook.nakov.com/mac-and-key-derivation/scrypt, Accessed Sep. 25, 2024, 5 pages.

Practical Cryptography for Developers, "PBKDF2," https://cryptobook.nakov.com/mac-and-key-derivation/pbkdf2, Accessed Sep. 25, 2024, 3 pages.

* cited by examiner

| | |
|---|---|
| 1 | FACTORY GENERATES OWNERSHIP VOUCHER WITH VENDOR ASSET MANAGER DETAILS AND TRANSFER TO VENDOR ASSET MANAGER |
| 2 | VENDOR ASSET MANAGER UPDATES OWNERSHIP VOUCHER WITH CUSTOMER DETAILS AND TRANSFER TO CUSTOMER |
| 3 | CUSTOMER UPDATES OWNERSHIP VOUCHER WITH ENROLLEE DETAILS AND TRANSFER TO CUSTOMER ONBOARDING SERVICE (COS) |
| 4A | COS EXTRACTS Wi-Fi CREDENTIAL GENERATION ALGORITHM, GENERATES INITIAL CREDENTIALS AS PROVISIONED IN COMPUTING DEVICE, AND EXTRACTS ENROLLEE-RELATED INFORMATION |
| 4B | COS DOWNLOADS ANY REQUIRED PARTS OF ALGORITHM FOR Wi-Fi CREDENTIAL GENERATION FROM VENDOR CLOUD |
| 5 | FACTORY SHIPS COMPUTING DEVICE TO DESTINATION COMPUTING SITE |
| 6 | COS PASSES ENROLLEE DETAILS AND CREDENTIALS TO DEVICE PROVISIONING PROTOCOL (DPP) CONFIGURATOR |
| 7 | DPP CONFIGURATOR CONNECTS TO DPP RELAY |
| 8 | DPP RELAY PLANTS INITIAL CREDENTIALS IN DPP-ENROLLED DEVICE (Wi-Fi ROUTER) AT DESTINATION COMPUTING SITE |
| 9 | COS PROVISIONS CONTROL PLANE DETAILS WITH RENDEZVOUS SERVICE |
| 10 | COMPUTING DEVICE IS POWERED ON AT THE DESTINATION COMPUTING SITE |
| 11A | COMPUTING DEVICE CONNECTS TO THE DPP ENROLLED DEVICE AT THE DESTINATION COMPUTING SITE |
| 11B | DPP ENROLLED DEVICE GETS CONTROL PLANE DETAILS FROM THE RENDEZVOUS SERVICE |
| 12 | COMPUTING DEVICE COMPLETES ZERO TOUCH ONBOARDING WITH THE COS |
| 13 | MANAGEMENT DEVICE UPDATES ENROLLEE AND Wi-Fi ROUTER CREDENTIALS IN ENDPOINT NETWORK MANAGEMENT SERVICE |
| 14 | ENDPOINT NETWORK MANAGEMENT SERVICE RESETS TEMPORARY CREDENTIALS IN THE COMPUTING DEVICE AND UPDATES USER-APPROVED CREDENTIALS IN THE COMPUTING DEVICE |

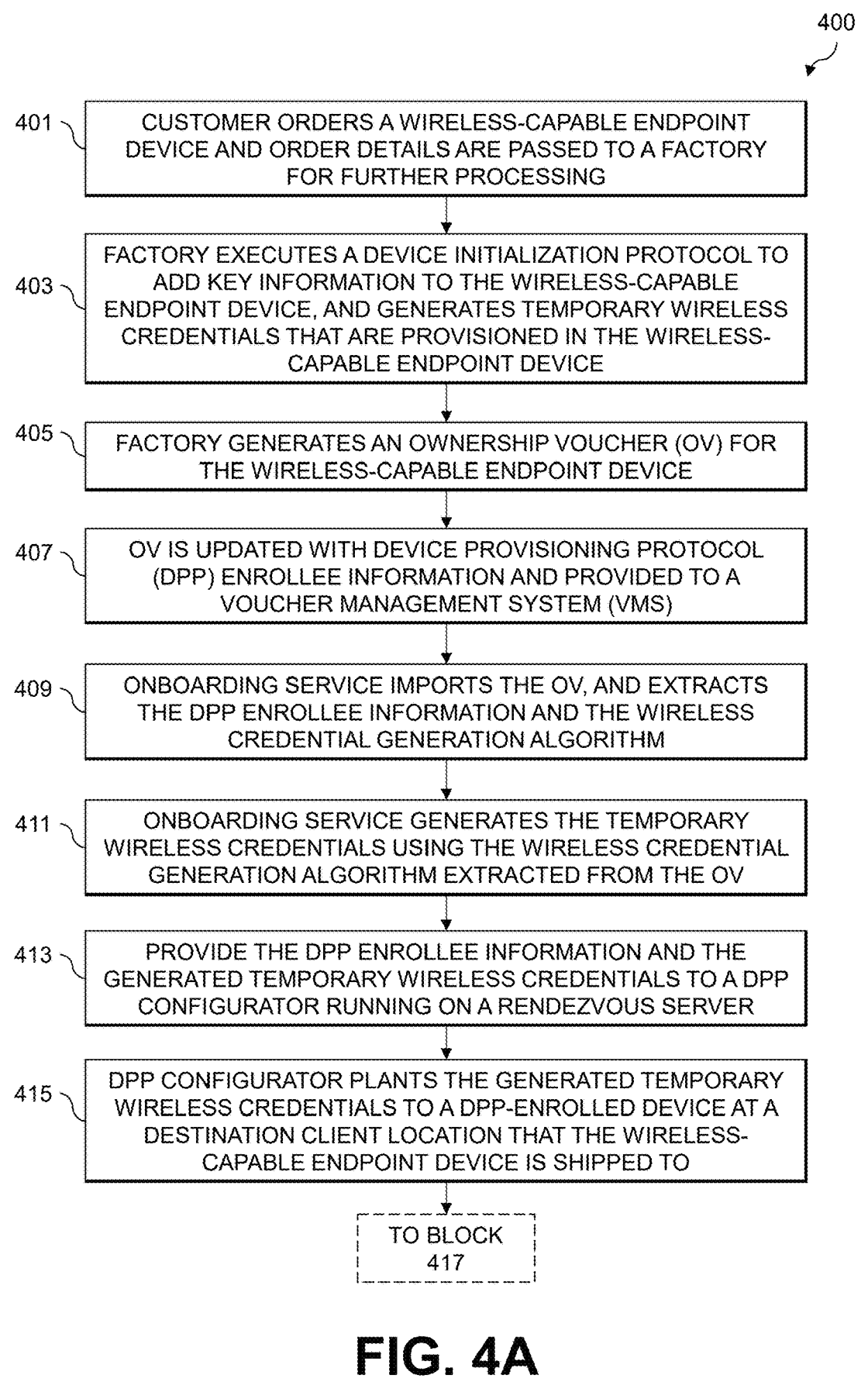

401 CUSTOMER ORDERS A WIRELESS-CAPABLE ENDPOINT DEVICE AND ORDER DETAILS ARE PASSED TO A FACTORY FOR FURTHER PROCESSING

403 FACTORY EXECUTES A DEVICE INITIALIZATION PROTOCOL TO ADD KEY INFORMATION TO THE WIRELESS-CAPABLE ENDPOINT DEVICE, AND GENERATES TEMPORARY WIRELESS CREDENTIALS THAT ARE PROVISIONED IN THE WIRELESS-CAPABLE ENDPOINT DEVICE

405 FACTORY GENERATES AN OWNERSHIP VOUCHER (OV) FOR THE WIRELESS-CAPABLE ENDPOINT DEVICE

407 OV IS UPDATED WITH DEVICE PROVISIONING PROTOCOL (DPP) ENROLLEE INFORMATION AND PROVIDED TO A VOUCHER MANAGEMENT SYSTEM (VMS)

409 ONBOARDING SERVICE IMPORTS THE OV, AND EXTRACTS THE DPP ENROLLEE INFORMATION AND THE WIRELESS CREDENTIAL GENERATION ALGORITHM

411 ONBOARDING SERVICE GENERATES THE TEMPORARY WIRELESS CREDENTIALS USING THE WIRELESS CREDENTIAL GENERATION ALGORITHM EXTRACTED FROM THE OV

413 PROVIDE THE DPP ENROLLEE INFORMATION AND THE GENERATED TEMPORARY WIRELESS CREDENTIALS TO A DPP CONFIGURATOR RUNNING ON A RENDEZVOUS SERVER

415 DPP CONFIGURATOR PLANTS THE GENERATED TEMPORARY WIRELESS CREDENTIALS TO A DPP-ENROLLED DEVICE AT A DESTINATION CLIENT LOCATION THAT THE WIRELESS-CAPABLE ENDPOINT DEVICE IS SHIPPED TO

TO BLOCK 417

FIG. 4A

SECURE WIRELESS ZERO TOUCH ONBOARDING OF COMPUTING DEVICES

BACKGROUND

Computing devices may be deployed to various customer or other end-user sites after passing through multiple sites in a supply chain. The supply chain may include, for example, a manufacturer or vendor of the computing devices, the customers or end-users of the computing devices, and one or more additional entities that are between the manufacturer or vendor and the customers or end-users. Such additional entities may include, but are not limited to, distributors, value-added resellers, etc. The additional entities may perform provisioning actions on the computing devices. In these and other cases, computing device onboarding at the customer or end-user sites is a complex task, as there is a need for trust between all parties in the supply chain to ensure that the computing devices received at the customer or end-user sites are authentic.

SUMMARY

Illustrative embodiments of the present disclosure provide techniques for secure wireless zero touch onboarding of computing devices to wireless network devices.

In one embodiment, an apparatus comprises at least one processing device comprising a processor coupled to a memory. The at least one processing device is configured to obtain a data structure, the obtained data structure comprising information utilizable for generating a temporary wireless credential for an endpoint computing device that is to be deployed at a first computing site, the temporary wireless credential being provisioned in the endpoint computing device at a second computing site different than the first computing site. The at least one processing device is also configured to generate, based at least in part on the obtained data structure, the temporary wireless credential for the endpoint computing device, to provision the temporary wireless credential in a wireless network device at the first computing site, and to verify a wireless connection between the endpoint computing device and the wireless network device at the first computing site, the wireless connection utilizing the temporary wireless credential. The at least one processing device is further configured, responsive to successfully verifying the wireless connection of the endpoint computing device to the wireless network device at the first computing site utilizing the temporary wireless credential, to provision an updated wireless credential in the endpoint computing device and the wireless network device, the updated wireless credential being specified by an operator of the first computing site.

These and other illustrative embodiments include, without limitation, methods, apparatus, networks, systems and processor-readable storage media.

BRIEF DESCRIPTION OF THE DRAWINGS

FIGS. 3A-3F show a system configured for secure wireless zero touch onboarding of an endpoint computing device deployed at a computing site in an illustrative embodiment.

FIGS. 4A and 4B show a process flow for secure wireless zero touch onboarding of an endpoint computing device at a destination computing site in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
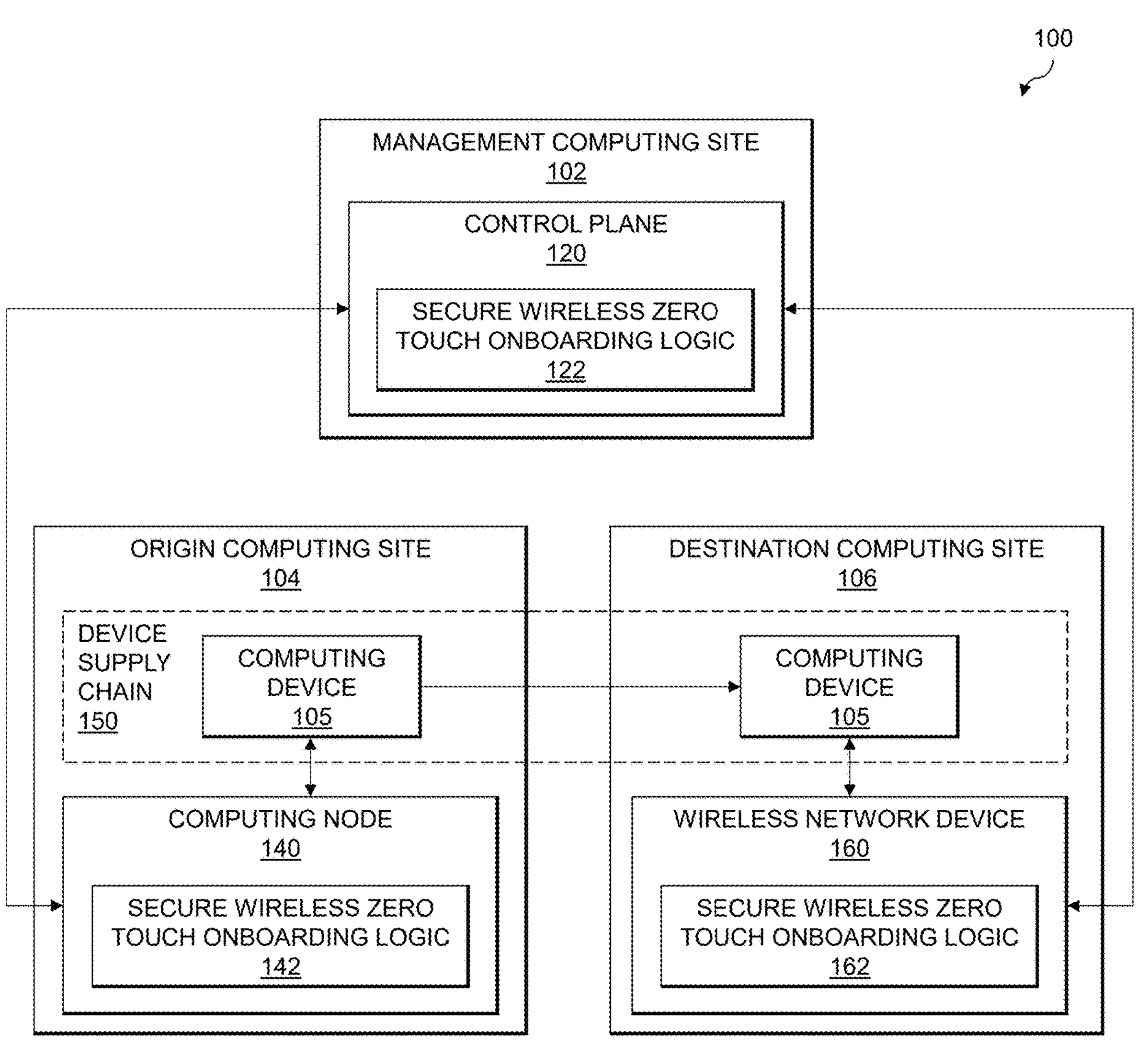
FIG. 1 is a block diagram of an information processing system configured for secure wireless zero touch onboarding of computing devices to wireless network devices in an illustrative embodiment.

FIG. 1 shows an information processing system 100 configured in accordance with an illustrative embodiment. The information processing system 100 is assumed to be built on at least one processing platform and provides functionality for secure wireless zero touch onboarding of computing devices. As used herein, "zero touch" onboarding refers to configuration or other provisioning of a computing device such that it is able to connect to a network at a computing site without requiring manual intervention. The "wireless" zero touch onboarding refers to such configuration or other provisioning of the computing device such that it is able to wirelessly connect to the network at the computing site without requiring manual intervention. Thus, wireless zero touch onboarding enables the computing device to be configured or otherwise provisioned without needing a human operator to physically type or otherwise provide input into a system console of the computing device being provisioned. As described in further detail below, the wireless zero touch provisioning in some cases only requires that a computing device be placed in some desired location and powered on.

The information processing system 100 includes a management computing site 102 implementing a control plane 120 with secure wireless zero touch onboarding logic 122, an origin computing site 104 with a computing node 140 implementing secure wireless zero touch onboarding logic 142, and a destination computing site 106 with a wireless network device 160 (e.g., a wireless router) implementing secure wireless zero touch onboarding logic 162. A computing device 105 is part of a device supply chain 150 which includes the origin computing site 104 and the destination computing site 106, as well as potentially other computing sites between the origin computing site 104 and the destination computing site 106 not explicitly shown.

The origin computing site 104 represents a factory or other facility where the computing device 105 is manufactured or other produced, and where the computing node 140 utilizes the secure wireless zero touch onboarding logic 142 to provision the computing device 105 with temporary wireless credentials (e.g., utilized for access the wireless network device 160 at the destination computing site 106). The control plane 120 of the management computing site 102 utilizes the secure wireless zero touch onboarding logic 122 to coordinate the provisioning of the temporary wireless credentials on the computing device 105 at the origin computing site 104 as well as in the wireless network device 160 at the destination computing site utilizing the secure wireless zero touch onboarding logic 162. The control plane 120 may further utilize the secure wireless zero touch onboarding logic 122, once the computing device 105 is successfully onboarded to the wireless network device 160 at the destination computing site 106, to provision "permanent" wireless credentials in both the computing device 105 and the wireless network device 160. The destination computing site 106 may be a customer site, an edge computing site, a data center, etc., that is remote from the management computing site 102 and the origin computing site 104. In some embodiments, however, the management computing site 102 may be co-located with the origin computing site 104 or the destination computing site 106 (e.g., at a same data center, a same cloud infrastructure, etc.). The management computing site 102, also referred to as a core computing site or core data center, is assumed to comprise a plurality of devices or nodes (e.g., physical and virtual computing resources or other information technology (IT) assets not shown in FIG. 1) that implement the control plane 120 providing the secure wireless zero touch onboarding logic 122.

The computing device 105 and the computing node 140 may comprise, for example, a physical computing device such as an Internet of Things (IoT) device, a mobile telephone, a laptop computer, a tablet computer, a desktop computer or other types of device. Such devices are examples of what are more generally referred to herein as "processing devices." Some of these processing devices are also generally referred to herein as "computers." The computing device 105 and the computing node 140 may also comprise, implement or run virtualized computing resources, such as virtual machines (VMs), containers, etc. The wireless network device 160, as noted above, may comprise a wireless router or other network device configured for wireless communication over one or more wireless networks with additional devices such as the computing device 105. The wireless network device 160 may also be connected or configured for connection with additional devices such as IT assets implementing the control plane 120 at the management computing site 102 using wireless and/or wired networks.

The computing device 105, the computing node 140 and the wireless network device 160 may in some embodiments comprise respective computers and/or network devices that are associated with one or more particular companies, organizations or other enterprises. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

Networks coupling the management computing site 102, the origin computing site 104 and the destination computing site 106 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

In some embodiments, the management computing site 102, the origin computing site 104 and/or the destination computing site 106 collectively provide at least a portion of an IT infrastructure operated by an enterprise. The IT infrastructure comprising the management computing site 102, the origin computing site 104 and/or the destination computing site 106 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the management computing site 102, the origin computing site 104 and/or the destination computing site 106. A given enterprise system may host assets that are associated with multiple enterprises (e.g., two or more different businesses, organizations or other entities). For example, in some cases the origin computing site 104 is associated with a first enterprise (e.g., a manufacturer or vendor of the computing device 105) from which one or more other enterprises (e.g., different customers or end-users) purchase devices such as the computing device 105 that are to be deployed at the destination computing site 106.

Although not explicitly shown in FIG. 1, one or more input-output devices such as keyboards, displays or other types of input-output devices may be used to support one or more user interfaces to the management computing site 102 and the origin computing site 104, as well as to support communication between the management computing site 102, the origin computing site 104, the destination computing site 106, and other related systems and devices not explicitly shown.

The secure wireless zero touch onboarding logics 122, 142 and 162 are configured to enable secure wireless zero touch onboarding of the computing device 105 to a wireless network of the wireless network device 160 at the destination computing site 106. The control plane 120 is configured to utilize the secure wireless zero touch onboarding logic 122 to obtain a data structure comprising information utilizable for generating a temporary wireless credential for the computing device 105 that is to be deployed at the destination computing site 106. The temporary wireless credential is provisioned in the computing device 105 by the computing node 140 at the origin computing site 104 utilizing the secure wireless zero touch onboarding logic 142. The control plane 120 is also configured to utilize the secure wireless zero touch onboarding logic 122 to generate the temporary wireless credential provisioned in the computing device 105 based at least in part on the obtained data structure. The control plane 120 is further configured to utilize the secure wireless zero touch onboarding logic 122, together with the secure wireless zero touch onboarding logic 162 at the wireless network device 160, to provision the temporary wireless credential in the wireless network device 160 at the destination computing site 106. The control plane 120 is further configured to utilize the secure wireless zero touch onboarding logic 122 to verify a wireless connection between the computing device 105 and the wireless network device 160 at the destination computing site 106, the wireless connection utilizing the temporary wireless credential. The control plane 120 is further configured to utilize the secure wireless zero touch onboarding logic 122, responsive to successfully verifying the wireless connection of the computing device 105 to the wireless network device 160 at the destination computing site 106 utilizing the temporary wireless credential, to provision an updated wireless credential in the computing device 105 and the wireless network device 160, the updated wireless credential being specified by an operator of the destination computing site 106.

At least portions of the secure wireless zero touch onboarding logics 122, 142 and 162 may be implemented at least in part in the form of software that is stored in memory and executed by a processor.

In some embodiments, ownership vouchers, certificates, key material, temporary and permanent wireless credentials, wireless credential generation algorithms, etc. used in the secure wireless zero touch onboarding of the computing device 105 may be stored in a database or other data store. The database or other data store may be implemented using one or more of storage systems that are part of or otherwise associated with one or more of the management computing site 102, the origin computing site 104 and/or the destination computing site 106. The storage systems may comprise a scale-out all-flash content addressable storage array or other type of storage array. The term “storage system” as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as an element of the management computing site 102 in the FIG. 1 embodiments, the control plane 120 or at least a portion thereof may in other embodiments be implemented at least in part externally to the management computing site 102, for example, as a stand-alone server, set of servers or other type of system coupled via one or more networks to the management computing site 102, the origin computing site 104 and/or the destination computing site 106.

The management computing site 102, the origin computing site 104 and the destination computing site 106 in the FIG. 1 embodiment are assumed to be implemented using at least one processing device. Each such processing device generally comprises at least one processor and an associated memory, and implements at least a portion of the functionality of the secure wireless zero touch onboarding logic 122, 142 or 162.

It is to be appreciated that the particular arrangement of the management computing site 102, the origin computing site 104 and the destination computing site 106 illustrated in the FIG. 1 embodiment is presented by way of example only, and alternative arrangements can be used in other embodiments. As discussed above, for example, the control plane 120 may be implemented at least in part external to the management computing site 102.

It is to be understood that the particular set of elements shown in FIG. 1 for secure wireless zero touch onboarding of computing devices to wireless network devices is presented by way of illustrative example only, and in other embodiments additional or alternative elements may be used. Thus, another embodiment may include additional or alternative systems, devices and other network entities, as well as different arrangements of modules and other components.

The management computing site 102, the origin computing site 104, the destination computing site 106 and other portions of the system 100, as will be described above and in further detail below, may be part of cloud infrastructure.

The management computing site 102, the origin computing site 104, the destination computing site 106 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The management computing site 102, the origin computing site 104 and the destination computing site 106, or components thereof, may be implemented on respective distinct processing platforms, although numerous other arrangements are possible. For example, in some embodiments at least portions of the management computing site 102, the origin computing site 104 and/or the destination computing site 106 are implemented on the same processing platform.

The term “processing platform” as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the management computing site 102, the origin computing site 104 and/or the destination computing site 106, or portions or components thereof, to reside in different data centers. Numerous other distributed implementations are possible.

Additional examples of processing platforms utilized to implement the management computing site 102, the origin computing site 104, the destination computing site 106 and other components of the system 100 in illustrative embodiments will be described in more detail below in conjunction with FIGS. 5 and 6.

It is to be appreciated that these and other features of illustrative embodiments are presented by way of example only, and should not be construed as limiting in any way.

An exemplary process for secure wireless zero touch onboarding of computing devices to wireless network devices will now be described in more detail with reference to the flow diagram of FIG. 2. It is to be understood that this particular process is only an example, and that additional or alternative processes for secure wireless zero touch onboarding of computing devices to wireless network devices may be used in other embodiments.

In this embodiment, the process includes steps 200 through 208. These steps are assumed to be performed by the control plane 120, the computing node 140 and the wireless network device 160 using the secure wireless zero touch onboarding logics 122, 142 and 162. The process begins with step 200, obtaining, at the control plane 120 of the management computing site 102, a data structure comprising information utilizable for generating a temporary wireless credential for the computing device 105 that is to be deployed at the destination computing site 106. The temporary wireless credential is provisioned in the computing device 105 at the origin computing site 104. The destination computing site 106 may be an edge computing site, with the computing device 105 being an edge computing device. The origin computing site 104 may be operated by a vendor of the computing device 105, the vendor of the computing device 105 being different than an operator of the destination computing site 106. The wireless network device 160 at the destination computing site 106 may be a wireless router.

In step 202, the control plane 120 generates the temporary wireless credential for the computing device 105 based at least in part on the data structure obtained in step 200.

In step 204, the control plane 120 provisions the temporary wireless credential in the wireless network device 160 at the destination computing site 106.

In step 206, the control plane 120 is configured to verify a wireless connection of the computing device 105 to the wireless network device 160 at the destination computing site 106, the wireless connection utilizing the temporary wireless credential.

In step 208, responsive to successfully verifying the wireless connection of the computing device 105 to the wireless network device 160 at the destination computing site 106, the control plane 120 provisions an updated wireless credential in the computing device 105 and the wireless network device 160, the updated wireless credential being specified by an operator of the destination computing site 106.

The data structure obtained in step 200 may comprise an ownership voucher (OV) associated with the computing device 105. The OV identifies an algorithm for generating the temporary wireless credential for the computing device 105. The OV may further identify the wireless network device 160 at the destination computing site 106. The control plane 120 may obtain, from an external server operated by a vendor of the computing device 105 (e.g., a vendor cloud), at least a portion of the algorithm for generating the temporary wireless credential for the computing device 105.

The OV may comprise first key information associated with the control plane 120, second key information associated with the operator of the destination computing site 106, and third key information associated with the vendor of the computing device 105. The control plane 120 may comprise a first cryptographic certificate associated with the control plane 120, a second cryptographic certificate associated with the operator of the destination computing site 106, and a third cryptographic certificate associated with the vendor of the computing device 105, the control plane 120 being configured to utilize the first, second and third cryptographic certificates to verify the first, second and third key information in the OV. Provisioning the temporary wireless credential in the wireless network device 160 at the destination computing site 106 in step 204 may be performed responsive to a successful verification by the control plane 120 of the first, second and third key information in the OV.

The control plane 120 may be configured for communication with the wireless network device 160 at the destination computing site 106 via a rendezvous server external to the destination computing site 106 and the control plane 120. The control plane 120 may be configured to utilize the rendezvous server for configuring the wireless network device 160 at the destination computing site 106 with a device provisioning protocol.

It should be noted that the term "data structure" as used herein is intended to be broadly construed. A data structure, such as the data structure referred to above, may provide a portion of a larger data structure, or the data structure may be a combination of multiple smaller data structures. The data structures may include tables, vectors, embeddings, key information, cryptographic certificates, or various other data structures or data items. It should further be appreciated that "generating" a data structure may encompass, for example, populating an existing or previously-created data structure with one or more data items.

Figure 2:
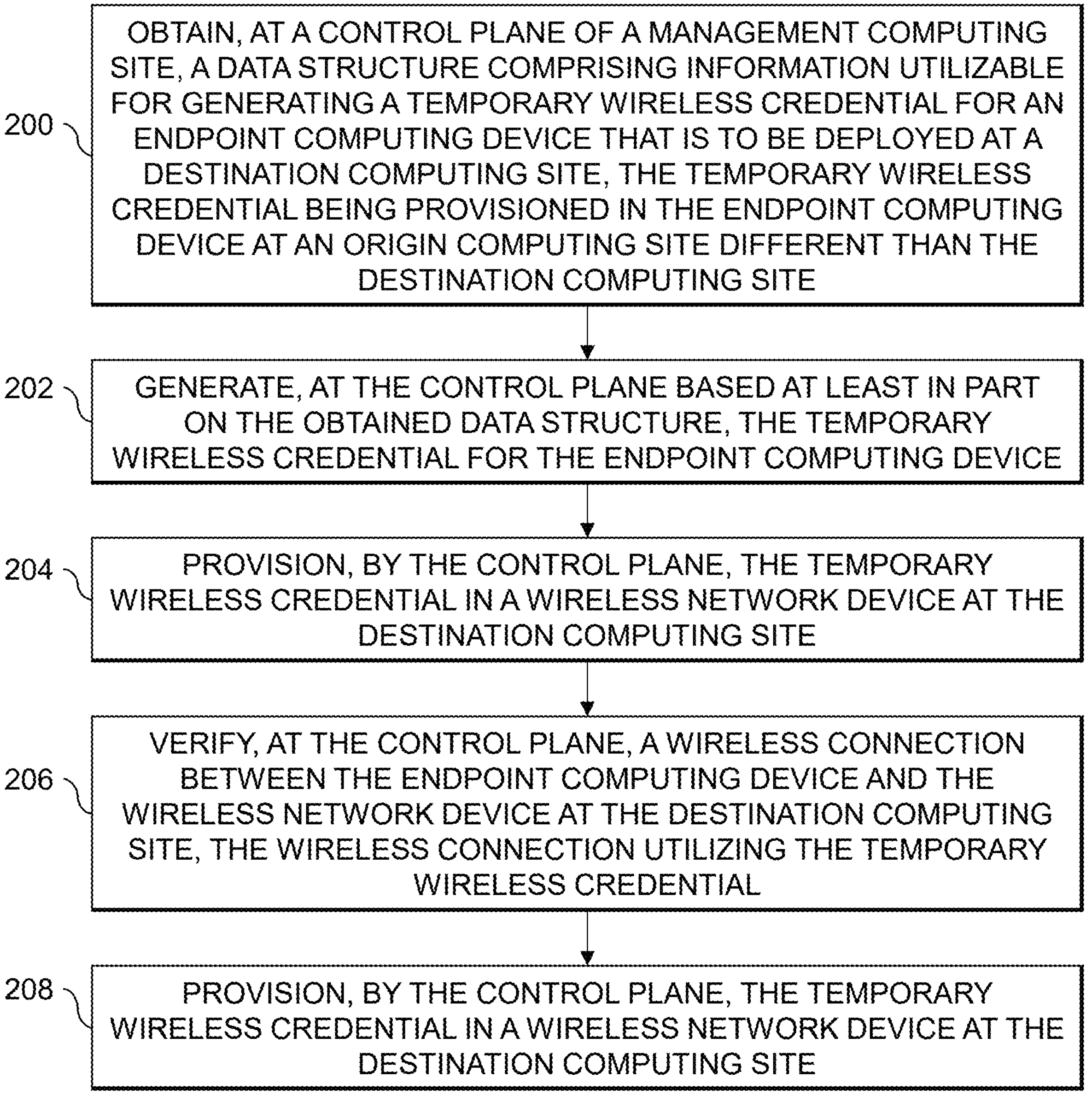
FIG. 2 is a flow diagram of an exemplary process for secure wireless zero touch onboarding of computing devices to wireless network devices in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Endpoint computing devices come in various form factors. At a client location (e.g., a destination computing site where the endpoint computing devices are to be deployed, such as edge computing sites where edge endpoint devices are to be deployed), wired endpoint computing devices may go through Fast IDentity Online (FIDO)-based onboarding with ease, as the wired endpoint computing devices would be in a Dynamic Host Configuration Protocol (DHCP) environment. Onboarding "wireless" endpoint computing devices (e.g., Wi-Fi enabled edge endpoint devices) presents technical challenges, as conventional approaches require users to manually provision credentials in a wireless router or other wireless network device at the client location where the wireless endpoint computing devices are to be deployed. As used herein, a "wireless" endpoint computing device refers to an endpoint computing device that is wireless-enabled or wireless-capable, such that the endpoint computing device is able to connect to a network wirelessly at a destination computing site.

Wireless endpoint computing devices are not embedded with any globally accepted wireless credentials, as this would present a security threat. As part of FIDO device onboarding, wireless endpoint computing devices are not able to connect to a rendezvous server, and thus need manual intervention to configure network settings, such as wireless credentials (e.g., Wi-Fi credentials), for connecting to a wireless router. Conventional approaches are thus not able to provide "zero touch" onboarding of wireless endpoint computing devices, as onboarding wireless endpoint computing devices requires either a service console or Near-field communication (NFC)/Bluetooth-supported mobile applications to manually configure wireless network settings in the wireless endpoint computing devices, demanding the presence of IT or operational technology (OT) administrators for onboarding each wireless endpoint computing device.

Conventional approaches for onboarding wireless endpoint computing devices thus face various technical challenges, including the requirement of manual IT/OT intervention. This requires setting up the wireless endpoint computing devices in the network (e.g., an ethernet network) and configuring router access through a service console application which includes deploying IT/OT administrators to remote areas. This may also or alternatively involve configuring router credentials manually from a mobile application (e.g., through NFC or Bluetooth). Conventional approaches are thus not able to provide “zero touch” onboarding for wireless edge endpoint devices. To the contrary, conventional approaches require significant manual effort and time-consuming operations, considering the scale of wireless-capable endpoint computing devices. One option for zero touch onboarding is to embed router credentials in wireless endpoint computing devices while they are in the factory. Such a solution, however, may present a security threat as wireless routers at customer sites may not be owned by the same entity that manufactures the wireless endpoint computing devices.

The technical solutions described herein provide techniques enabling secure wireless zero touch onboarding of endpoint computing devices at destination computing sites. The destination computing sites may be customer environments which include wireless routers or other network devices that are not owned or under the control of a manufacturer or vendor of the wireless endpoint computing devices.

Figure 3A:
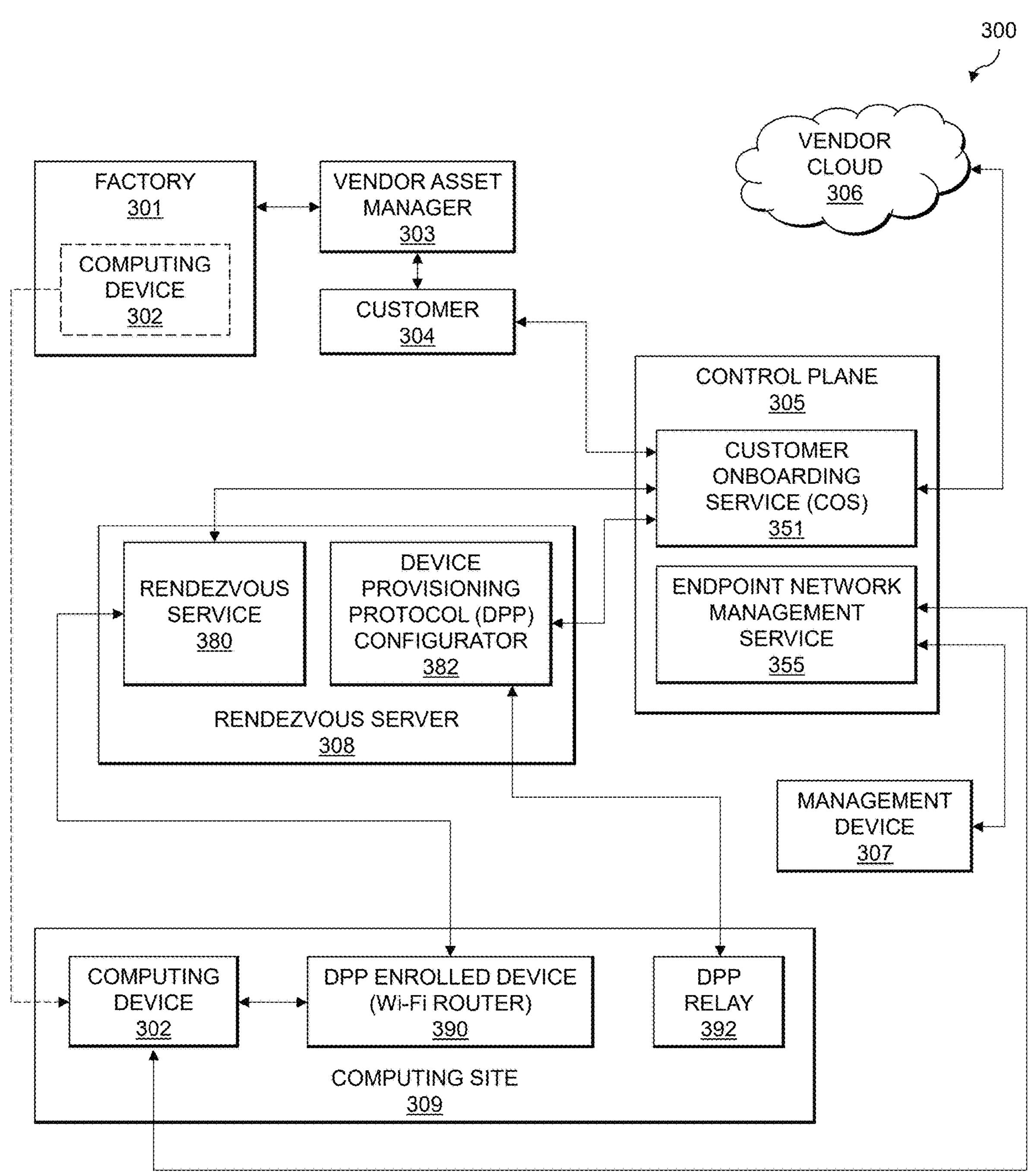

FIG. 3A shows a system 300 configured for secure wireless zero touch onboarding of endpoint computing devices at destination computing sites. The system 300 includes a factory 301 where a computing device 302 (e.g., a wireless-enabled or wireless-capable edge endpoint device) is manufactured or produced for a vendor, a vendor asset manager 303, a customer 304, a control plane 305 implementing a customer onboarding service (COS) 351 and an endpoint network management service 355, a vendor cloud 306, a management device 307, a rendezvous server 308 implementing a rendezvous service 380 and a device provisioning protocol (DPP) configurator 382, and a computing site 309 comprising a DPP enrolled device 390 (e.g., a Wi-Fi or other wireless router) and a DPP relay 392. The computing device 302 is manufactured or produced at the factory 301 for a vendor that operates at least the vendor asset manager 303 and the vendor cloud 306. The customer 304 orders the computing device 302, which is to be deployed at the computing site 309. The COS 351 of the control plane 305 and the rendezvous server 308 operate in conjunction with the DPP enrolled device 390 and the DPP relay 392 to perform a secure wireless zero touch onboarding of the computing device 302 (e.g., connecting the computing device 302 to the DPP enrolled device 390 at the computing site 309 via a wireless network). The management device 307 utilizes the endpoint network management service 355 of the control plane 305 to configure user-approved credentials in the computing device 302 (e.g., replacing initial or temporary credentials provisioned in the computing device 302 at the factory 301, after the computing device 302 is onboarded using such initial or temporary credentials as discussed in further detail below).

Figure 3B:
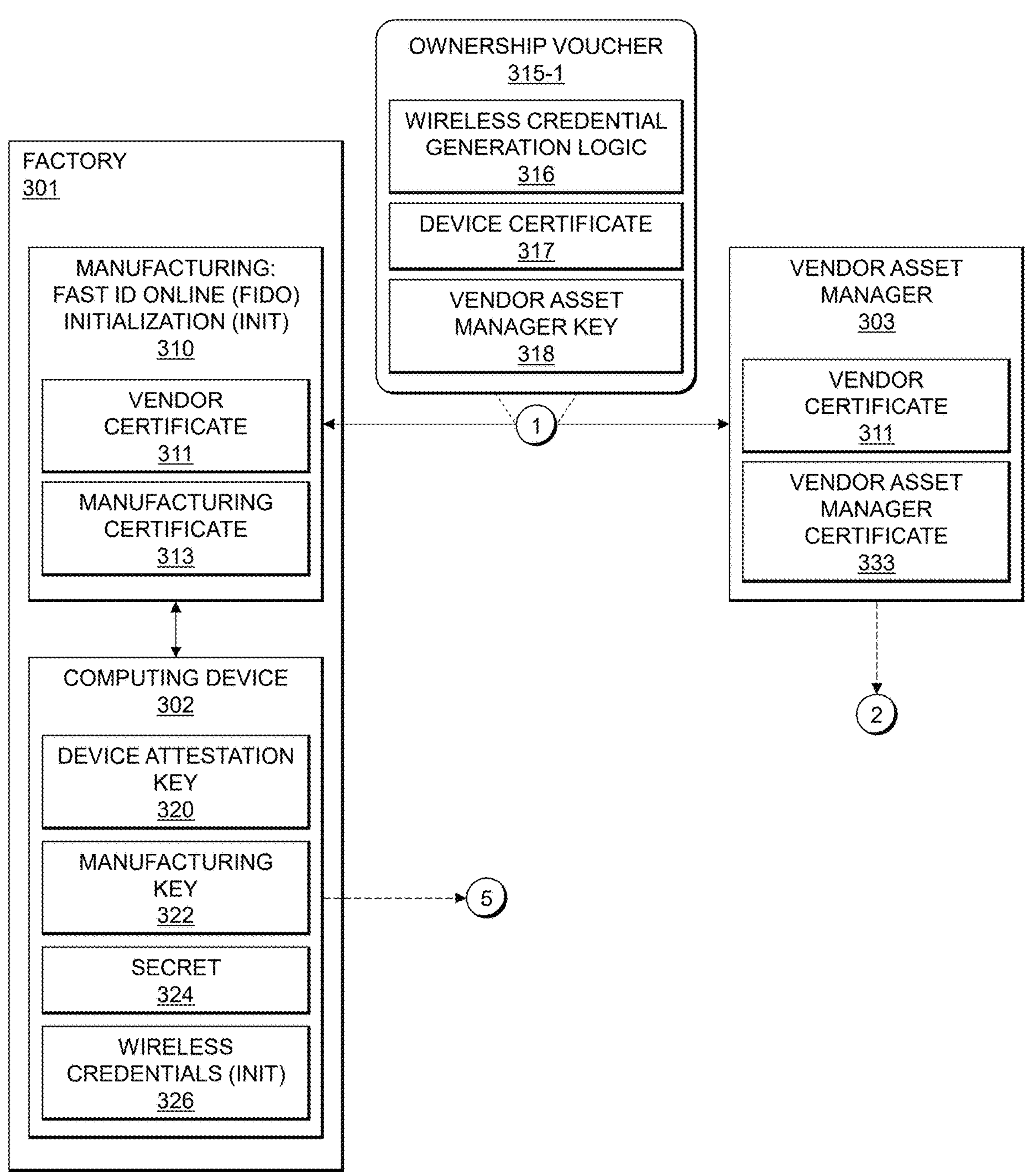
Figure 3C:
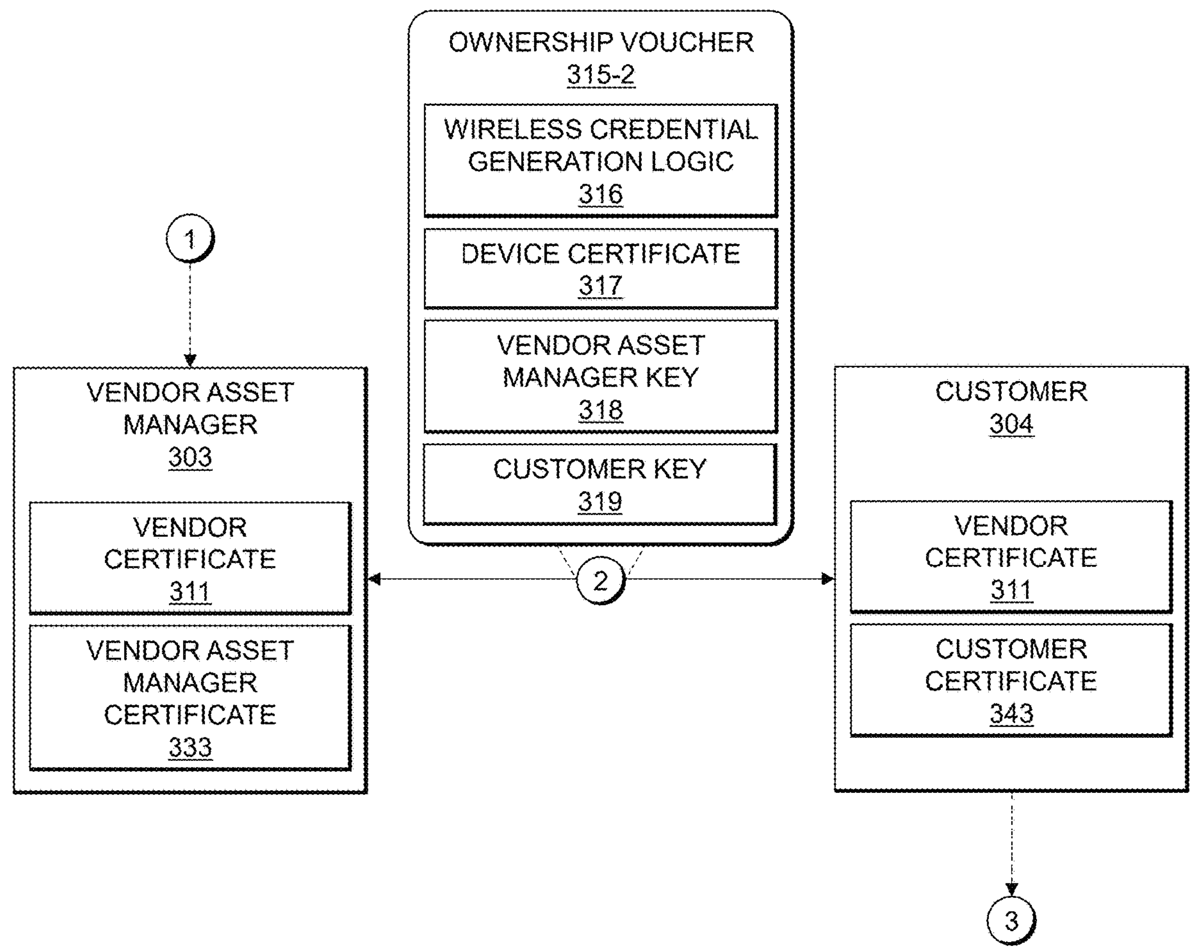
Figure 3D:
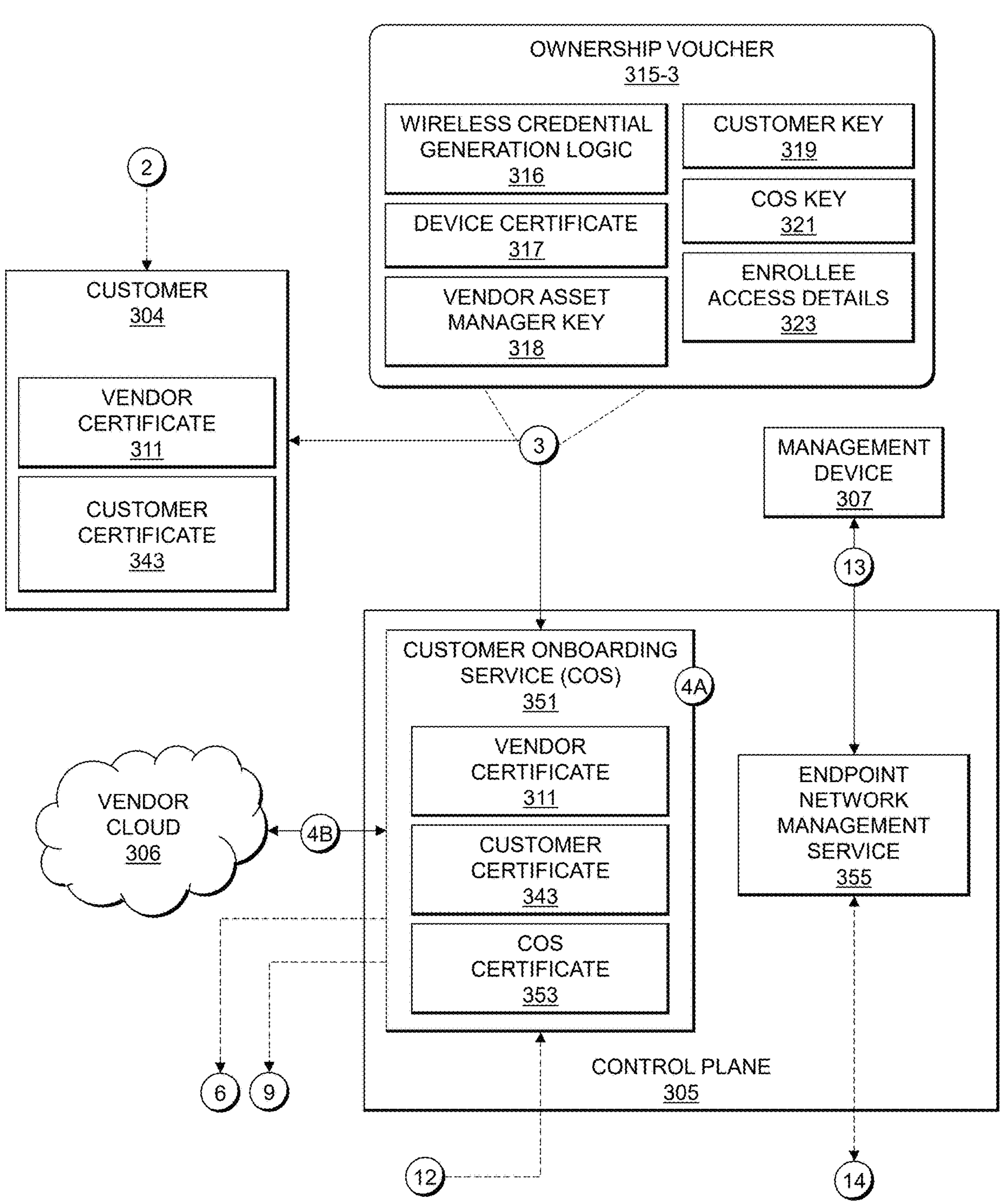

FIGS. 3B-3E shows steps 1 through 14 of a system flow for performing the secure wireless zero touch onboarding of the computing device 302 at the computing site 309, and FIG. 3F provides a table 399 detailing the operations performed during steps 1 through 14 of the system flow. The system flow includes:

1. As shown in FIG. 3B, the factory 301 produces a manufacturing FIDO initialization (init) 310 for the computing device 302, which includes a vendor certificate 311 and a manufacturing certificate 313. The manufacturing FIDO initialization 310 is used to generate an ownership voucher 315-1 for the computing device 302, which includes wireless network credential generation logic 316, a device certificate 317 and a vendor asset manager key 318 for the vendor asset manager 318. The vendor asset manager 303 includes the vendor certificate 311 and a vendor asset manager certificate 333. As part of manufacturing or producing the computing device 302, the factory 301 provisions a device attestation key 320, a manufacturing key 322, a secret 324, and initial wireless credentials 326 in the computing device 302. The computing device 302 may be associated with a globally unique identifier (GUID), which is used for tracking and identifying the computing device 302 throughout the system flow illustrated in FIGS. 3B-3E.
2. As shown in FIG. 3C, the ownership voucher 315-1 is updated to the ownership voucher 315-2 so as to include customer details including a customer key 319 from the customer 304, where the customer 304 has the vendor certificate 311 and a customer certificate 343.
3. As shown in FIG. 3D, the ownership voucher 315-2 is updated to the ownership voucher 315-3 so as to include enrollee details including a COS key 321 and enrollee access details 323 from the COS 351 of the control plane 305, where the COS 351 includes the vendor certificate 311, the customer certificate 343 and a COS certificate 353.

4A. As shown in FIG. 3D, the COS 351 extracts a wireless credential generation algorithm (e.g., the wireless credential generation logic 316) from the ownership voucher 315-3, and generates the initial wireless credentials 326 as provisioned in the computing device 302. The COS 351 further extracts enrollee-related information from the enrollee access details 323 in the ownership voucher 315-3.

4B. As shown in FIG. 3D, if necessary, the COS 351 downloads any required parts of the wireless credential generation algorithm from the vendor cloud 306.

Figure 3E:
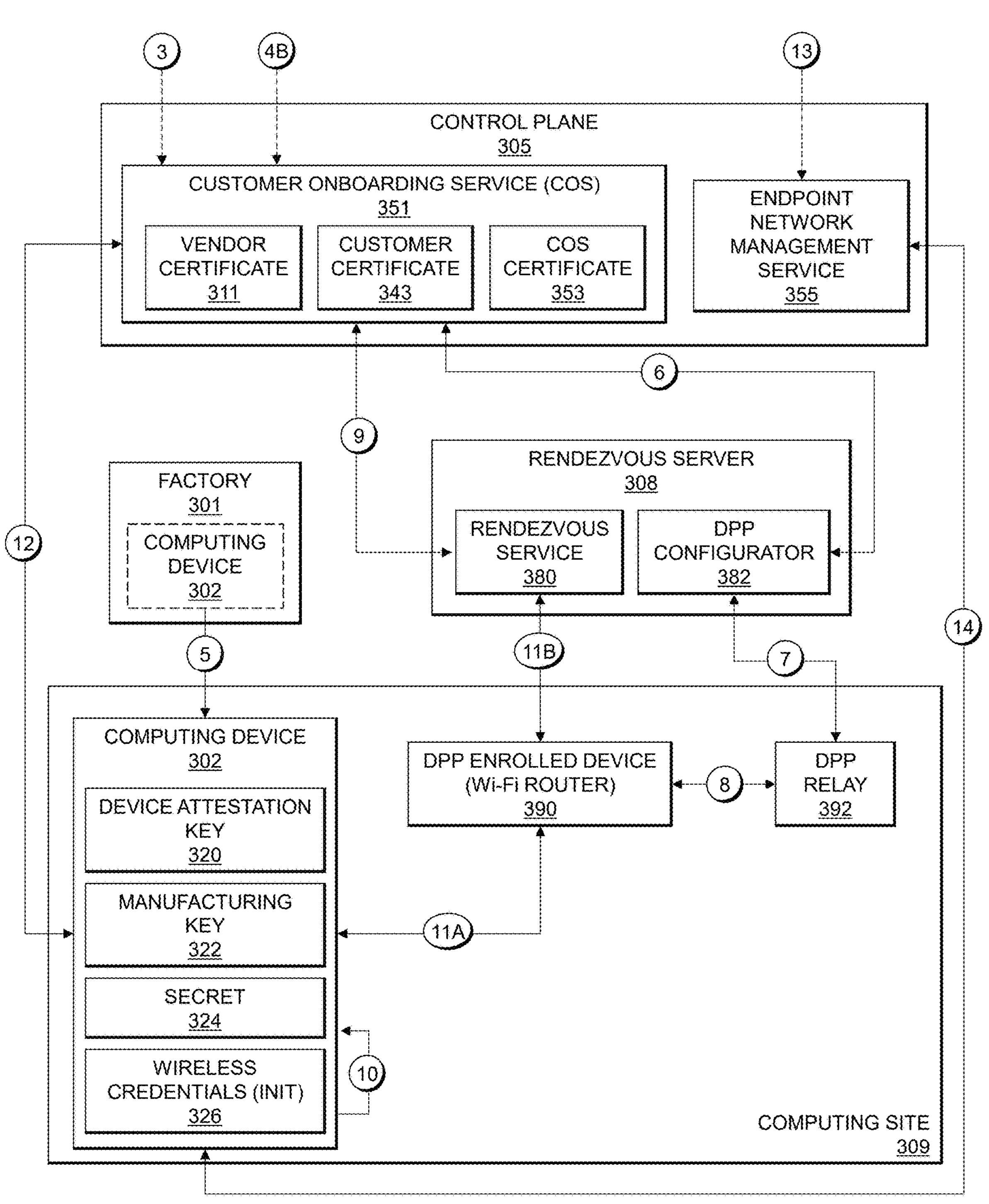

5. As shown in FIG. 3E, the computing device 302 is shipped from the factory 301 to the destination computing site 309.
6. As shown in FIG. 3E, the COS 351 passes enrollee details (e.g., for the DPP enrolled device 390 at the destination computing site 309) and the initial wireless credentials to the DPP configurator 382 at the rendezvous server 308.
7. As shown in FIG. 3E, the DPP configurator 382 connects to the DPP relay 392 at the computing site 309.
8. As shown in FIG. 3E, the DPP relay 392 plants or provisions the initial wireless credentials in the DPP enrolled device 390 at the computing site 309.
9. As shown in FIG. 3E, the COS 351 provisions control plane details with the rendezvous service 380 at the rendezvous server 308.
10. As shown in FIG. 3E, the computing device 302 is powered on at the computing site 309.

11A. As shown in FIG. 3E, the computing device 302 connects to the DPP enrolled device 390 at the computing site 309, using the initial wireless credentials 326 provisioned in the computing device 302.

11B. As shown in FIG. 3E, the DPP enrolled device 390 obtains the control plane details from the rendezvous service 380.

12. As shown in FIG. 3E, the computing device 302 completes the secure wireless zero touch onboarding with the COS 351 (e.g., for "Day 1" operation of the computing device 302 at the computing site 309).

13. As shown in FIG. 3E, the management device 307 updates enrollee details and wireless credentials in the endpoint network management service 355. The management device 307 may be operated by a user or administrator of the computing site 309, which is able to provide wireless credentials to be used after the successful onboarding of the computing device 302 using the initial wireless credentials 326.

14. As shown in FIG. 3E, the endpoint network management service 355 resets or updates the temporary credentials (the initial wireless credentials 326) in the computing device 302 with user-approved "permanent" credentials. Here, "permanent" refers to credentials that are used after the zero touch onboarding of the computing device 302. These credentials, however, may be updated as desired over time.

The technical solutions provide secure wireless zero touch onboarding functionality for onboarding of wireless edge endpoint devices to an edge computing ecosystem. The secure wireless zero touch onboarding functionality includes generating and embedding temporary Wi-Fi or other wireless credentials (e.g., initial wireless credentials 326) on wireless edge endpoint devices (e.g., computing device 302) in the factory (e.g., factory 301), while ensuring that the same temporary Wi-Fi or other wireless credentials are generated and configured in a client's wireless router (e.g., DPP enrolled device 390) at a destination computing site (e.g., computing site 309) where the wireless edge endpoint devices are deployed. Such functionality ensures that shipped wireless edge endpoint devices, when powered on at the destination computing sites (e.g., client locations), are able to connect to the wireless routers at the destination computing sites, to complete FIDO "Day 1" operation.

Figure 4B:
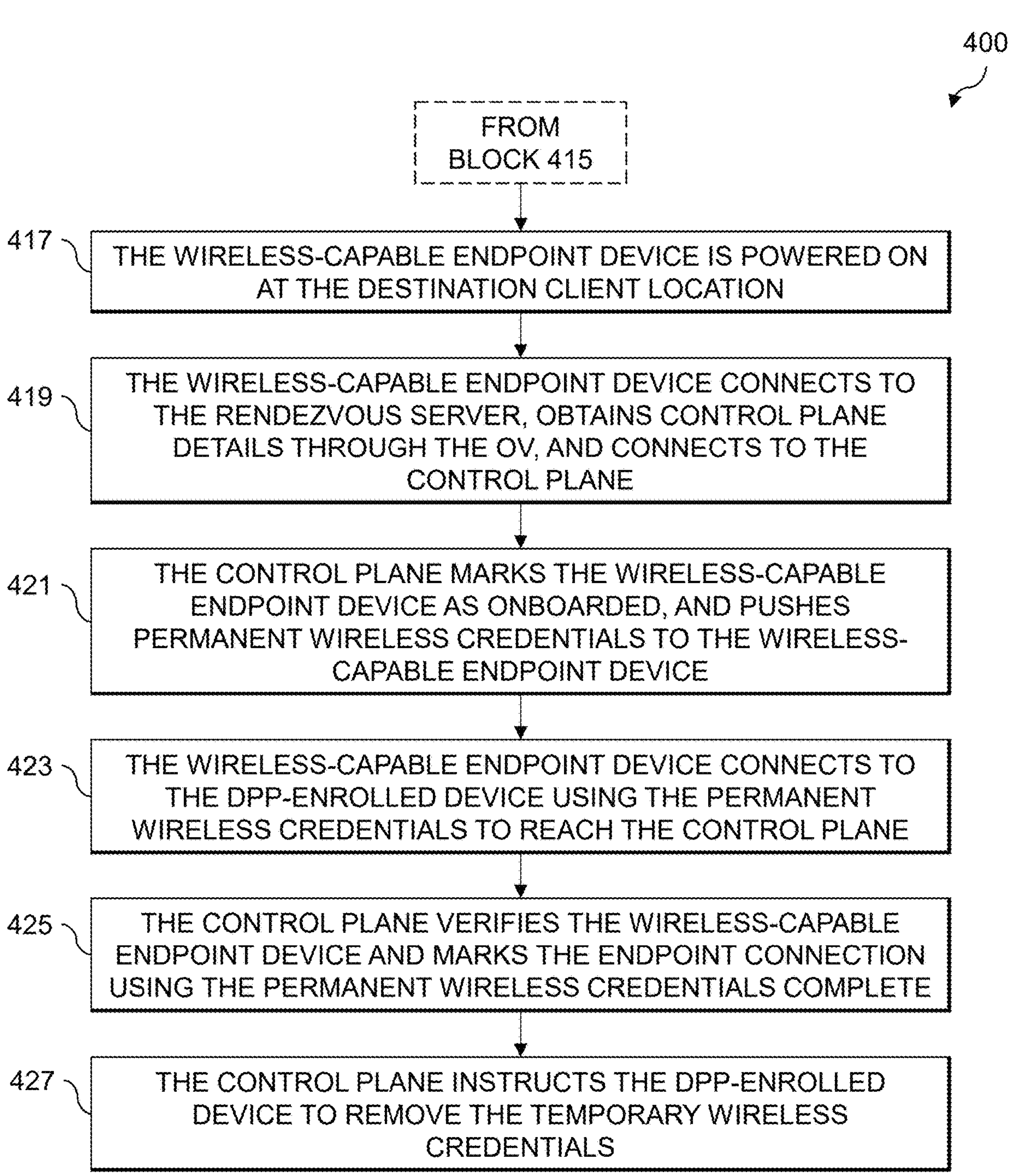

FIGS. 4A and 4B show a process flow 400 for secure wireless zero touch onboarding of wireless-capable endpoint devices. As shown in FIG. 4A, the process flow 400 begins in block 401 with a customer ordering a wireless-capable endpoint device, and passing order details for the wireless-capable endpoint device to a factory that will manufacture or produce the wireless-capable endpoint device. In block 403, the factory executes a device initialization protocol (e.g., a FIDO Device Initialization (FIDO-DI) protocol) to add key information (e.g., a key pair) to the wireless-capable endpoint device, and generates temporary wireless credentials (e.g., Wi-Fi credentials) which are embedded or otherwise provisioned in the wireless-capable endpoint device. At this point, the wireless-capable endpoint device may be shipped to a destination client location from the factory. In block 405, the factory generates an Ownership Voucher (OV) for the wireless-capable endpoint device, which includes device information for the wireless-capable endpoint device along with the next owner's public key. The OV is further extended to carry an algorithm or logic for generating the temporary wireless credentials that are embedded in the wireless-capable endpoint device.

In block 407, the OV goes through one or more ownership changes until reaching a final owner that updates DPP enrollee information in the OV, which is provided to a Voucher Management System (VMS). In block 409, an onboarding service (e.g., a COS, a FIDO onboarding service, etc.) imports the OV for the wireless-capable endpoint device to be onboarded, and extracts the DPP enrollee information and the wireless credential generation algorithm. In block 411, the onboarding service generates the temporary wireless credentials using the extracted wireless credential generation algorithm.

In block 413, a DPP configurator running on a rendezvous server is provided with the DPP enrollee information and enrollee credentials (e.g., the temporary wireless credentials generated using the wireless credential generation algorithm extracted from the OV). In block 415, the DPP configurator plants the temporary wireless credentials in a DPP-enrolled device (e.g., a wireless router) at the destination client location, through a DPP relay (e.g., a Transport Control Protocol (TCP)/Internet Protocol (IP) path) acting as a bridge between the DPP configurator and the DPP-enrolled device.

As shown in FIG. 4B, the process flow 400 continues with block 417 where the client powers on the wireless-capable endpoint device at the destination client location. The boot sequence on the wireless-capable endpoint device will try to connect to the DPP-enrolled device (e.g., the wireless router) using the factory-embedded temporary wireless credentials (which, through the processing discussed above, would be the same as the temporary wireless credentials passed to the DPP-enrolled device by the DPP configurator.

In block 419, the wireless-capable endpoint device connects to the rendezvous server, which obtains control plane details through the OV, and the wireless-capable endpoint device further connects to the control plane. In block 421, the control plane marks the wireless-capable endpoint for onboarding, and pushes "permanent" wireless credentials, which are signed using a control plane key, to the wireless-capable endpoint device. The "permanent" wireless credentials replace the "temporary" wireless credentials provisioned in the wireless-capable endpoint device at the factory. The "permanent" wireless credentials may first be verified to ascertain that they are associated with an authentic source (e.g., that is authorized to provide credentials for the destination client location) before they are pushed to the wireless-capable endpoint device.

In block 423, the wireless-capable endpoint device connects to the DPP-enrolled device using the permanent wireless credentials to reach the control plane. In block 425, the control plane marks the edge endpoint connection of the wireless-capable endpoint device through the DPP-enrolled device as complete, with the wireless-capable endpoint device signing the permanent wireless credentials sent by the control plane. The control plane verifies the signed payload with the wireless-capable endpoint device's public key (e.g., obtained from a vendor of the wireless-capable endpoint device through the OV). In block 427, the control plane instructs the DPP configurator to issue commands to the DPP enrollee to remove the temporary wireless credentials.

The wireless credential generation algorithm or logic may utilize various different cryptographic protocols, including but not limited to Password-Based Key Derivation Function 2 (PBKDF2), Bcrypt, Scrypt, Argon2, etc., which may utilize inputs such as a password, a salt, memory, iterations, hash length, etc. for generation of the temporary wireless credentials. Some of such inputs are only known to certain entities in the system (e.g., the factory and the control plane) to make it difficult for malicious users to generate the temporary wireless credentials.

The technical solutions described herein provide functionality for enabling secure wireless zero touch onboarding for wireless-enabled or wireless-capable computing devices (also referred to herein as endpoint devices, edge devices, edge endpoint devices, etc.). The secure wireless zero touch onboarding provides an end-to-end (E2E) secure mechanism for generating and adding temporary wireless credentials to wireless routers where wireless-capable computing devices will be deployed and onboarded. The wireless credentials may be generated using a synthesized FIDO or other ownership voucher, and using the DPP protocol for communication from a control plane through a rendezvous server to the wireless router (e.g., a DPP-enrolled device). The technical solutions thus provide a novel mechanism for credentialing wireless-capable computing devices, including native edge endpoint devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for secure wireless zero touch onboarding of computing devices to wireless network devices will now be described in greater detail with reference to FIGS. 5 and 6. Although described in the context of system 100, these platforms may also be used to implement at least portions of other information processing systems in other embodiments.

Figure 5:
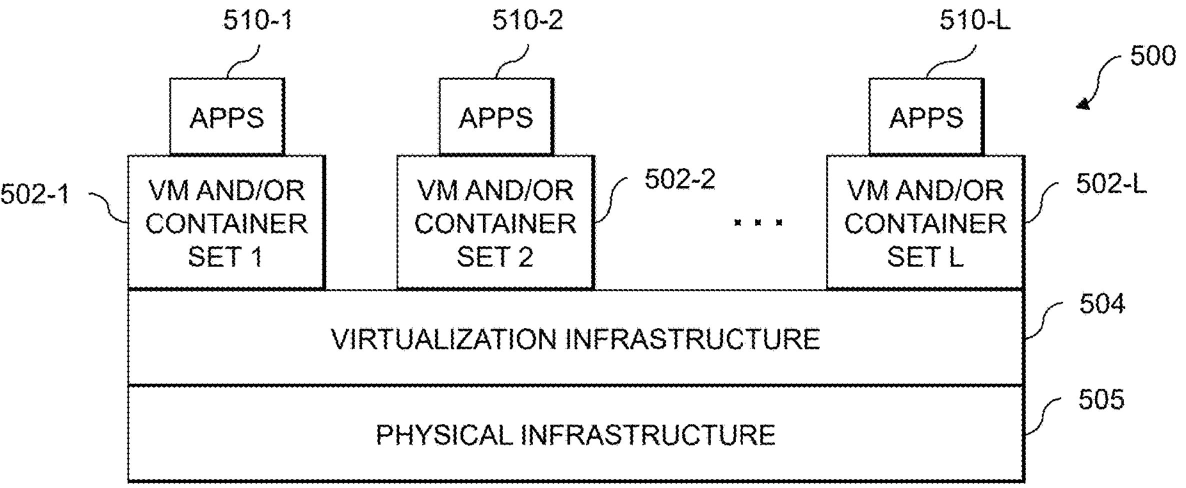
FIGS. 5 and 6 show examples of processing platforms that may be utilized to implement at least a portion of an information processing system in illustrative embodiments.
Figure 6:
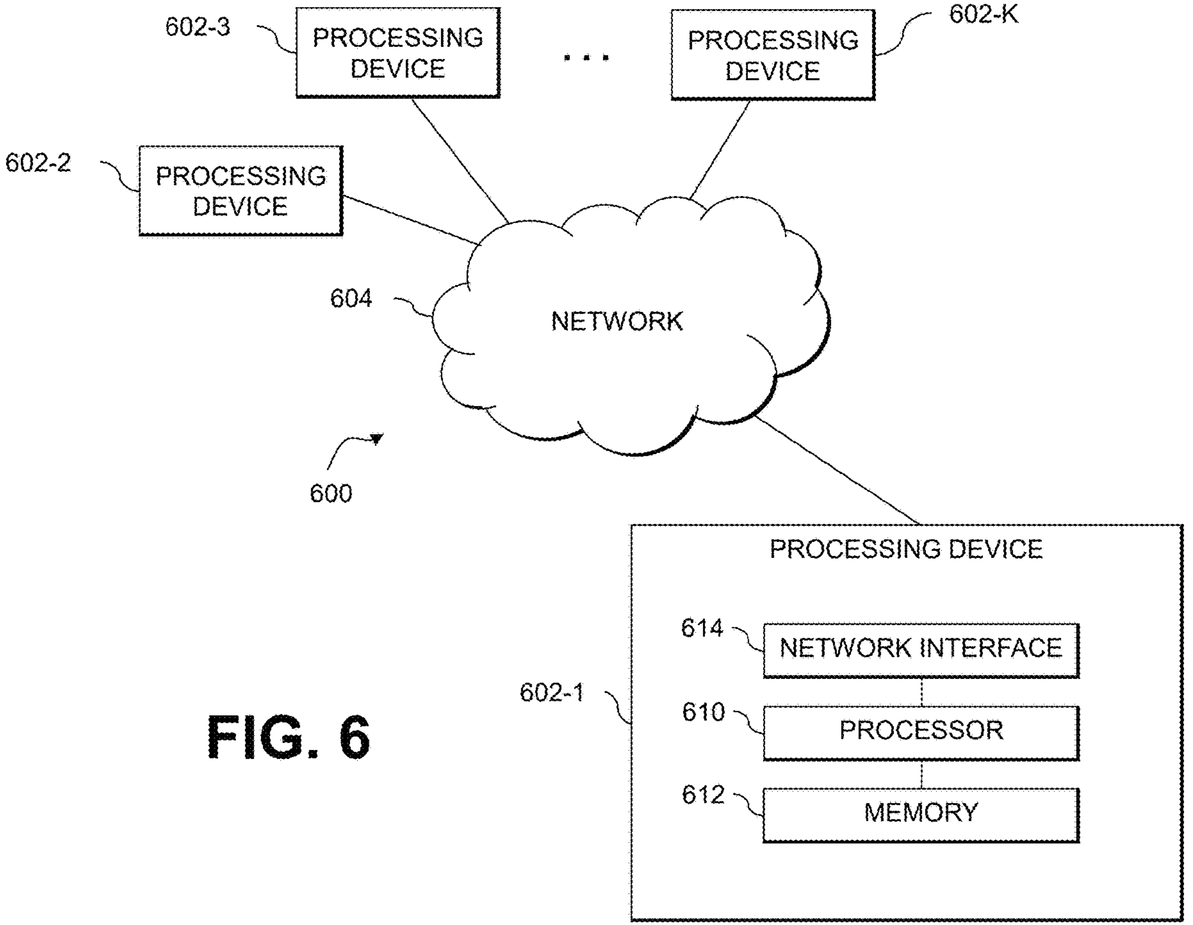

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for secure wireless zero touch onboarding of computing devices to wireless network devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured to implement a control plane configured for onboarding of an endpoint computing device that is to be deployed at a first computing site:

to obtain a data structure, the obtained data structure comprising information utilizable for generating a temporary wireless credential for the endpoint computing device that is to be deployed at the first computing site, the temporary wireless credential being provisioned in the endpoint computing device at a second computing site different than the first computing site;

to generate, based at least in part on the obtained data structure, the temporary wireless credential for the endpoint computing device;

to provision the temporary wireless credential in a wireless network device at the first computing site;

to verify a wireless connection between the endpoint computing device and the wireless network device at the first computing site, the wireless connection utilizing the temporary wireless credential;

responsive to successfully verifying the wireless connection of the endpoint computing device to the wireless network device at the first computing site utilizing the temporary wireless credential, to provision an updated wireless credential in the endpoint computing device and the wireless network device, the updated wireless credential being specified by an operator of the first computing site;

to receive, from the endpoint computing device, a payload comprising the updated wireless credential signed using a private key of a key pair associated with the endpoint computing device;

to verify the payload received from the endpoint computing device utilizing a public key of the key pair associated with the endpoint computing device; and responsive to successfully verifying the payload received from the endpoint computing device, to instruct the endpoint computing device to remove the temporary wireless credential provisioned in the endpoint computing device.

2. The apparatus of claim 1 wherein the first computing site comprises an edge computing site, and the endpoint computing device comprises an edge computing device.

3. The apparatus of claim 1 wherein the second computing site is operated by a vendor of the endpoint computing device, the vendor of the endpoint computing device being different than the operator of the first computing site.

4. The apparatus of claim 1 wherein the wireless network device at the first computing site comprises a wireless router.

5. The apparatus of claim 1 wherein the obtained data structure comprises an ownership voucher associated with the endpoint computing device, the ownership voucher identifying an algorithm for generating the temporary wireless credential for the endpoint computing device.

6. The apparatus of claim 5 wherein the ownership voucher further identifies the wireless network device at the first computing site.

7. The apparatus of claim 5 wherein the at least one processing device is further configured to obtain, from an external server operated by a vendor of the endpoint computing device, at least a portion of the algorithm for generating the temporary wireless credential for the endpoint computing device.

8. The apparatus of claim 1 wherein the control plane is part of a data center external to the first computing site.

9. The apparatus of claim 1 wherein the obtained data structure comprises an ownership voucher associated with the endpoint computing device, the ownership voucher comprising first key information associated with the control plane, second key information associated with an operator of the first computing site and third key information associated with a vendor of the endpoint computing device.

10. The apparatus of claim 9 wherein the control plane comprises a first cryptographic certificate associated with the control plane, a second cryptographic certificate associated with the operator of the first computing site, and a third cryptographic certificate associated with the vendor of the endpoint computing device, the control plane being configured to utilize the first, second and third cryptographic certificate to verify the first, second and third key information in the ownership voucher.

11. The apparatus of claim 10 wherein provisioning the temporary wireless credential in the wireless network device at the first computing site is responsive to a successful verification by the control plane of the first, second and third key information in the ownership voucher.

12. The apparatus of claim 1 wherein the control plane is configured for communication with the wireless network device at the first computing site via a rendezvous server external to the first computing site and the control plane.

13. The apparatus of claim 12 wherein the control plane is configured to utilize the rendezvous server for configuring the wireless network device at the first computing site with a device provisioning protocol.

14. A computer program product comprising a non-transitory processor-readable storage medium having stored therein program code of one or more software programs, wherein the program code when executed by at least one processing device implementing a control plane configured for onboarding of an endpoint computing device that is to be deployed at a first computing site causes the at least one processing device:

to obtain a data structure, the obtained data structure comprising information utilizable for generating a temporary wireless credential for the endpoint computing device that is to be deployed at the first computing site, the temporary wireless credential being provisioned in the endpoint computing device at a second computing site different than the first computing site;

to generate, based at least in part on the obtained data structure, the temporary wireless credential for the endpoint computing device;

to provision the temporary wireless credential in a wireless network device at the first computing site;

to verify a wireless connection between the endpoint computing device and the wireless network device at the first computing site, the wireless connection utilizing the temporary wireless credential;

responsive to successfully verifying the wireless connection of the endpoint computing device to the wireless network device at the first computing site utilizing the temporary wireless credential, to provision an updated wireless credential in the endpoint computing device and the wireless network device, the updated wireless credential being specified by an operator of the first computing site;

to receive, from the endpoint computing device, a payload comprising the updated wireless credential signed using a private key of a key pair associated with the endpoint computing device;

to verify the payload received from the endpoint computing device utilizing a public key of the key pair associated with the endpoint computing device; and responsive to successfully verifying the payload received from the endpoint computing device, to instruct the endpoint computing device to remove the temporary wireless credential provisioned in the endpoint computing device.

15. The computer program product of claim 14 wherein the obtained data structure comprises an ownership voucher associated with the endpoint computing device, the ownership voucher comprising first key information associated with the control plane, second key information associated with an operator of the first computing site and third key information associated with a vendor of the endpoint computing device.

16. The computer program product of claim 15 wherein the control plane comprises a first cryptographic certificate associated with the control plane, a second cryptographic certificate associated with the operator of the first computing site, and a third cryptographic certificate associated with the vendor of the endpoint computing device, the control plane being configured to utilize the first, second and third cryptographic certificate to verify the first, second and third key information in the ownership voucher, wherein provisioning the temporary wireless credential in the wireless network device at the first computing site is responsive to a successful verification by the control plane of the first, second and third key information in the ownership voucher.

17. A method performed by at least one processing device comprising a processor coupled to a memory, the at least one processing device implementing a control plane configured for onboarding of an endpoint computing device that is to be deployed at a first computing site, the method comprising:

obtaining a data structure, the obtained data structure comprising information utilizable for generating a temporary wireless credential for the endpoint computing device that is to be deployed at the first computing site, the temporary wireless credential being provisioned in the endpoint computing device at a second computing site different than the first computing site;

generating, based at least in part on the obtained data structure, the temporary wireless credential for the endpoint computing device;

provisioning the temporary wireless credential in a wireless network device at the first computing site;

verifying a wireless connection between the endpoint computing device and the wireless network device at the first computing site, the wireless connection utilizing the temporary wireless credential;

responsive to successfully verifying the wireless connection of the endpoint computing device to the wireless network device at the first computing site utilizing the temporary wireless credential, provisioning an updated wireless credential in the endpoint computing device and the wireless network device, the updated wireless credential being specified by an operator of the first computing site;

receiving, from the endpoint computing device, a payload comprising the updated wireless credential signed using a private key of a key pair associated with the endpoint computing device;

verifying the payload received from the endpoint computing device utilizing a public key of the key pair associated with the endpoint computing device; and responsive to successfully verifying the payload received from the endpoint computing device, instructing the endpoint computing device to remove the temporary wireless credential provisioned in the endpoint computing device.

18. The method of claim 17 wherein the obtained data structure comprises an ownership voucher associated with the endpoint computing device, the ownership voucher comprising first key information associated with the control plane, second key information associated with an operator of the first computing site and third key information associated with a vendor of the endpoint computing device.

19. The method of claim 18 wherein the control plane comprises a first cryptographic certificate associated with the control plane, a second cryptographic certificate associated with the operator of the first computing site, and a third cryptographic certificate associated with the vendor of the endpoint computing device, the control plane being configured to utilize the first, second and third cryptographic certificate to verify the first, second and third key information in the ownership voucher, wherein provisioning the temporary wireless credential in the wireless network device at the first computing site is responsive to a successful verification by the control plane of the first, second and third key information in the ownership voucher.

20. The method of claim 17 wherein the control plane is configured for communication with the wireless network device at the first computing site via a rendezvous server external to the first computing site and the control plane.

* * * * *